S. MIERZWINSKI.
VEHICLE.
APPLICATION FILED JUNE 18, 1920.

1,369,043.

Patented Feb. 22, 1921.

INVENTOR
Stanislaw Mierzwinski
BY
George C. Heinrich
ATTORNEY

UNITED STATES PATENT OFFICE.

STANISLAW MIERZWINSKI, OF TRENTON, NEW JERSEY.

VEHICLE.

1,369,043.　　　　　Specification of Letters Patent.　　Patented Feb. 22, 1921.

Application filed June 18, 1920. Serial No. 389,802.

*To all whom it may concern:*

Be it known that I, STANISLAW MIERZWINSKI, a citizen of Poland, residing at Trenton, county of Mercer, and State of New Jersey, have invented certain new and useful Improvements in Vehicles, of which the following is a specification.

This invention relates to improvements in vehicles which are propelled by the feet of the passengers, particularly so-called velocipedes, and it is the principal object of the invention to provide a quadrupedal vehicle which may be conveniently used by an entire family of four as means to travel quickly and easily from place to place without the expenditure of expensive fuel.

One of the objects of the invention is to provide a vehicle of the character mentioned which can easily be steered and braked.

Further objects, as well as novel features of the invention will specifically be defined hereinafter, reference being had to the accompanying drawing, in which—

Figure 1:
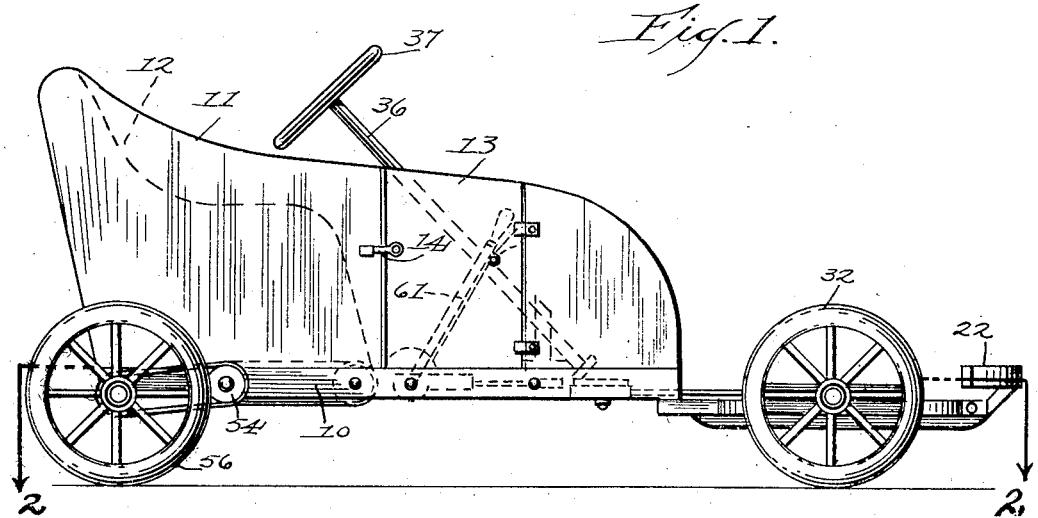
Figure 2:
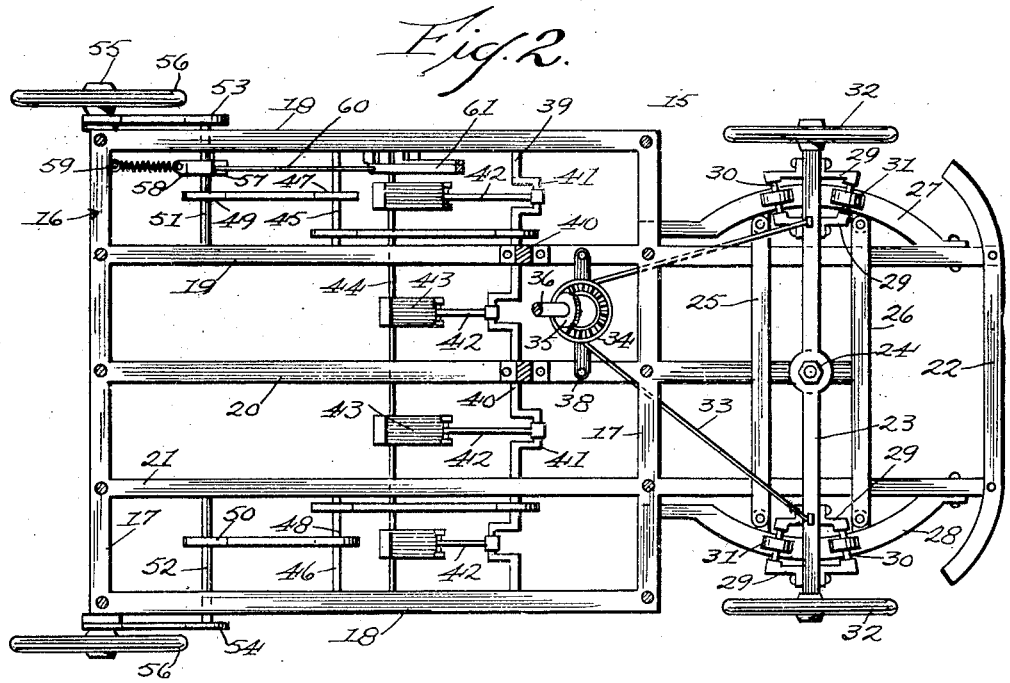

Figure 1 is a side view of a vehicle constructed according to the present invention, and Fig. 2 is a top plan view of the same seen along line 2—2 of Fig. 1.

As shown, the vehicle 10 comprises a chassis 11 containing a seat outlined at 12 and a hinged door 13 adapted to be locked by a latch 14 or the like.

The chassis rests upon a truck 15 consisting of a rectangular frame 16, the end bars 17 of which are connected by two longitudinal side bars 18 and intermediate bars 19, 20 and 21. The bars 19 and 21 at the front part of the truck 15 are extended over the frame 16 and carry at their outer ends a fender 22. The bar 20 between bars 19 and 21 is also extended beyond the frame but is shorter than the bars 19 and 21 and carries near its front end the front axle 23 of the vehicle secured to the bar 20 by the customary king-bolt 24. In front and in the rear of the front axle the bar 20 carries two transversal bars 25 and 26 respectively, the outer ends of which support two trackways 27 and 28 respectively which are secured with their outer ends, to the outer lateral edges of the bars 19 and 21, while their inner ends are fastened to the front end bar 17 of the frame 16. Brackets 29 are bolted pairwise to the lateral edges to the front axle 23 in the manner shown in Fig. 2 to both sides of the trackways 27 and 28, so that the oppositely disposed ends of a pair of brackets on the same side of the front axle form bearings for pins 30 of rollers 31 which are pairwise arranged to run on trackways 27 and 28. The ends of the front axle carry the customary front wheels 32, and the ends of a steering cable 33 are secured to the upper face of the front axle. The cable is wound around the shaft of a bevel wheel 34 adapted to be engaged by the bevel gear 35 at the end of a steering post 36 provided at its upper end with the customary steering hand wheel 37. The shaft of the wheel 34 is rotatably supported on a cross-bar 28 secured with its ends to the bars 19 and 20. The crank shaft 39 is rotatably secured with its outer ends in the bars 18 while intermediate its ends it is guided in guides 40 of the bars 19, 20 and 21. The shaft 39 is intermediate its ends between the bars 18 and the bars 19, 20 and 21 provided with crank arms 41 adapted to be engaged by connecting rods 42 of pedals 43 in the customary well known manner, which rest upon a common rod 44 secured to the bars 18 of the frame. In the rear of the rod 44 two short shafts 45 and 46 are journaled in the outer bars 18 and the bar 19 and 21 respectively and carry sprocket wheels over which chains are guided which run also over similar sprocket wheels on the crank shaft 39. Other sprocket wheels 47 and 48 are secured to the shafts 45 and 46 respectively over which chains are guided in the customary well known manner which are also guided over similar sprocket wheels 49 and 50 upon shafts 51 and 52 secured in the bars 18 and 19 and 21 respectively, the outer ends of which are extended over the sides of the vehicle and carry sprocket wheels 53 and 54 over which chains are guided which also run over sprocket wheels on the rear axle 55 of the vehicle at the outer ends of which the customary rear wheels 56 are secured.

The shaft 51 carries also a brake wheel 57 adapted to be engaged by a brake-band 58 to which one end of a spring 59 is secured, the other end of which is fastened to the rear end bar 17 of the frame 16. The upper front end of the band 58 is connected by a rod 60 with the lower end of a brake lever 61 of the ordinary well known construction.

The operation of the device will be clear from the above description without further explanation.

Having thus explained the nature of my invention and described the manner of using the same, although without attempting to set forth all the forms in which it may be made without departing from the spirit and scope of my invention, what I claim is—

In a vehicle of the character described, the combination of a wheeled truck comprising a frame, a front extension on said frame, trackways secured to said extension, a front axle pivotally secured to said extension, brackets pairwise arranged at both sides of said front axle over said trackways, pins secured in the oppositely disposed ends of each pair of said brackets, and rollers on said pins adapted to run on said trackways, means for steering the front axle.

In testimony whereof I have affixed my signature.

STANISLAW MIERZWINSKI.